United States Patent
Schmidt et al.

[11] Patent Number: 6,137,564
[45] Date of Patent: Oct. 24, 2000

[54] DISTANCE MEASURING DEVICE

[75] Inventors: Dirk Schmidt; Juergen Luginsland, both of Leinfelden-Echterdingen; Joerg Stierle, Waldenbuch; Peter Wolf, Leinfelden-Echterdingen; Gunter Flinspach, Leonberg, all of Germany

[73] Assignee: Robert Bosch GmbH, Stuttgart, Germany

[21] Appl. No.: 09/243,088

[22] Filed: Feb. 2, 1999

[30] Foreign Application Priority Data

Feb. 3, 1998 [DE] Germany .......................... 198 04 051

[51] Int. Cl.⁷ .............................. G01C 3/08; G01S 13/08; G01S 15/00
[52] U.S. Cl. .............................. 356/4.01; 342/118; 367/99
[58] Field of Search .................................. 356/4.01, 3.01; 367/99; 342/118

[56] References Cited

U.S. PATENT DOCUMENTS

| | | | |
|---|---|---|---|
| 4,730,190 | 3/1988 | Win et al. | 342/118 |
| 5,287,627 | 2/1994 | Rando | 367/99 |

FOREIGN PATENT DOCUMENTS 43 16 348 A1  11/1994  Germany .

*Primary Examiner*—Stephen C. Buczinski
*Attorney, Agent, or Firm*—Michael J. Striker

[57] ABSTRACT

A distance measuring device having a housing, a transmitting and receiving unit for measuring signal arranged in the housing, an evaluated element for determining a distance to an object by a travel time measurement, at least one reference point fixed on the housing to which a measured distance is referred, the at least one reference point being a part of a reference plane, such that an abutment surface which faces an object and an abutment surface which faces away from the object are arranged in the reference plane and fixed to the housing.

9 Claims, 3 Drawing Sheets

DISTANCE MEASURING DEVICE

BACKGROUND OF THE INVENTION

The present invention relates to distance measuring devices.

One of such devices is disclosed for example in the German patent document DE-A-43 16 348. It is used for different measuring operations. For example, the measuring device can be used for frequently needed applications to measure from an inner surface, for example an inner wall, bottom, or cover at a rear side, or in other words with an abutment surface which faces away from the object and abuts against a reference surface. For this case, where measurements must be performed starting from an outer edge, the known distance measuring device can abut in direction toward the object to be measured at its front surface, or in other words, with an abutment surface facing the object, against the reference surface. Depending on the application, as a device-side reference or zero point of the distance measurements is determined the front side or the rear side of the distance measuring device is determined. This however has a disadvantage that the operator must introduce the selected abutment type so as to take into consideration the associated reference point during the measurements. When an error occurs in this introduction or the introduction is forgotten, false measurement results can be obtained.

SUMMARY OF THE INVENTION

Accordingly, it is an object of present invention to provide a distance measuring device of the above mentioned general type, which eliminates the disadvantages of the prior art.

In keeping with these objects and with others which will become apparent herein after, one feature of present invention resides, briefly stated, in a distance measuring device, in which at least one reference point is a part of a reference plane, in which both an abutment surface facing the object and an abutment surface facing away of the object are arranged fixed with a housing.

When the distance measuring device is designed in accordance with the present invention it gives the advantages that both the rear-side abutment as well as the abutment in the direction to the object can have always the same reference point for the determination of the distance. Calculations between different reference points are therefore superfluous and the measuring errors resulting from them are avoided.

In accordance with further features of present invention, the abutment surfaces can extend substantially perpendicular to an outlet axis of the measuring signal. An abutment surface which faces the object can extend outwardly beyond a housing-side abutment surface. The housing-side abutment surface can be formed by projecting cams on a lower side of the housing. The abutment surface facing away from the object can be lowered relative to the housing-side abutment surface.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
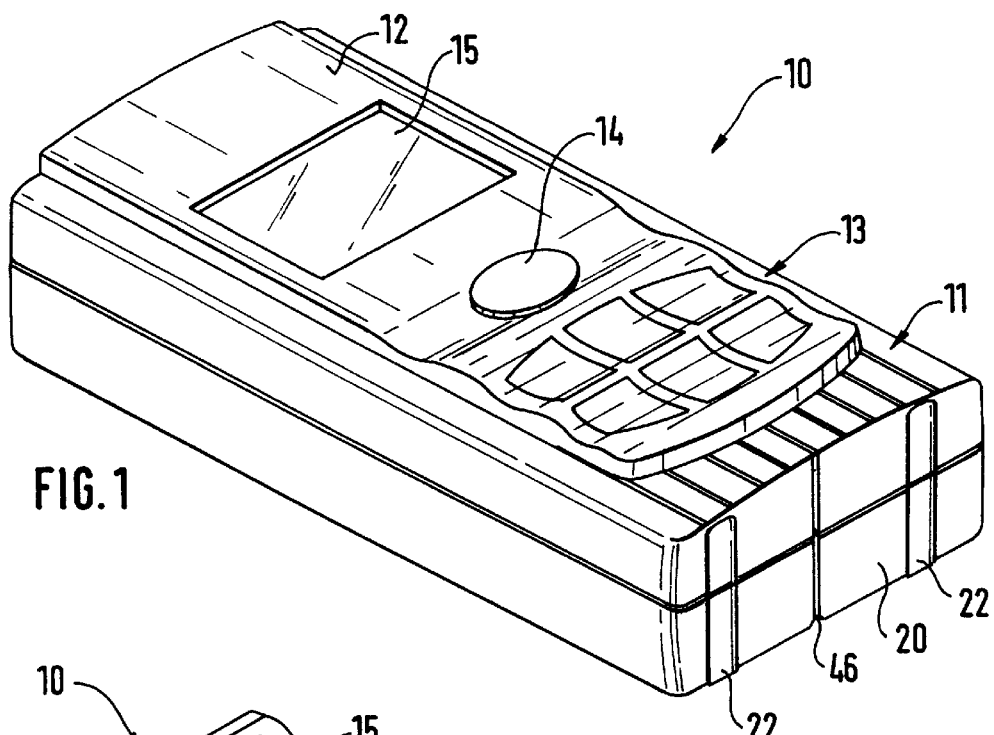
FIG. 1 is a perspective view of a distance measuring device.

A distance measuring device in accordance with the present invention is identified in FIG. 1 with reference numeral 10. It has a housing 11 which is formed as parallelepiped. Operational buttons 13 are provided on an upper part 12 of the housing 1 for switching on and switching off and for calling various measuring programs as well as a key 14 for releasing a measuring process.

An indicator 15 is also located on the upper surface 12. A determined measuring value as well as informations about the selected to measuring programs are indicated for example in the indicator 15. A rear side 20 of the housing 11 serves with projecting abutment strips 22 as an abutment surface, facing away from the object, for measurements of inner surfaces facing toward the object, such as for example walls, ceilings, floors, etc. as a reference surface.

Figure 2:
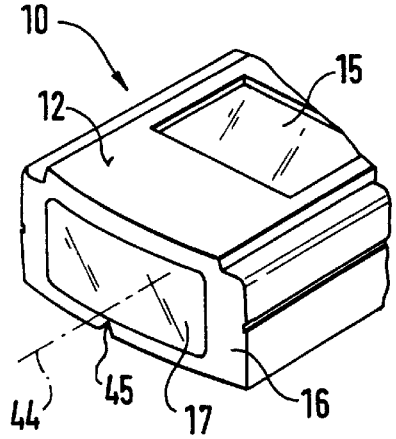
FIG. 2 is a perspective partial view of the distance measuring device from the front.

FIG. 2 shows a front side 16 of the distance measuring device. The front side 16 is provided with a window 17 for entering and exiting a measuring signal.

Figure 3:
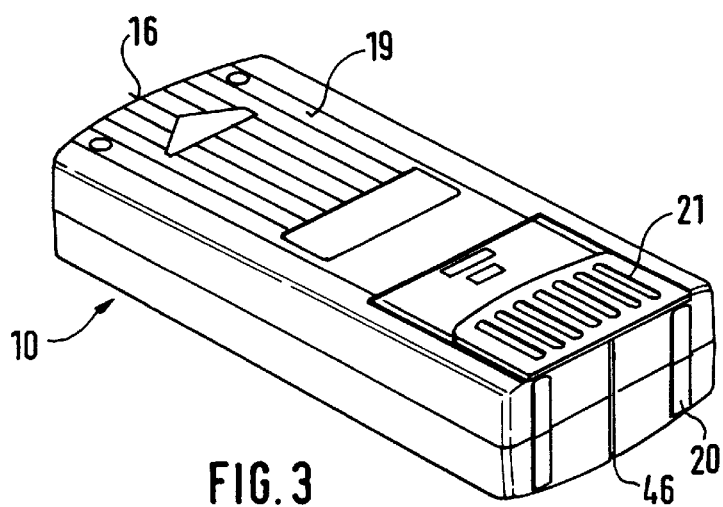
FIG. 3 is a perspective view of the measuring device inclinedly from below.

FIG. 3 shows a lower side 19 of the distance measuring device 10. The lower side 19 operates as an abutment surface. A flap 21 is supported in the region of the rear side 20 and is fixed with the housing.

Figure 4:
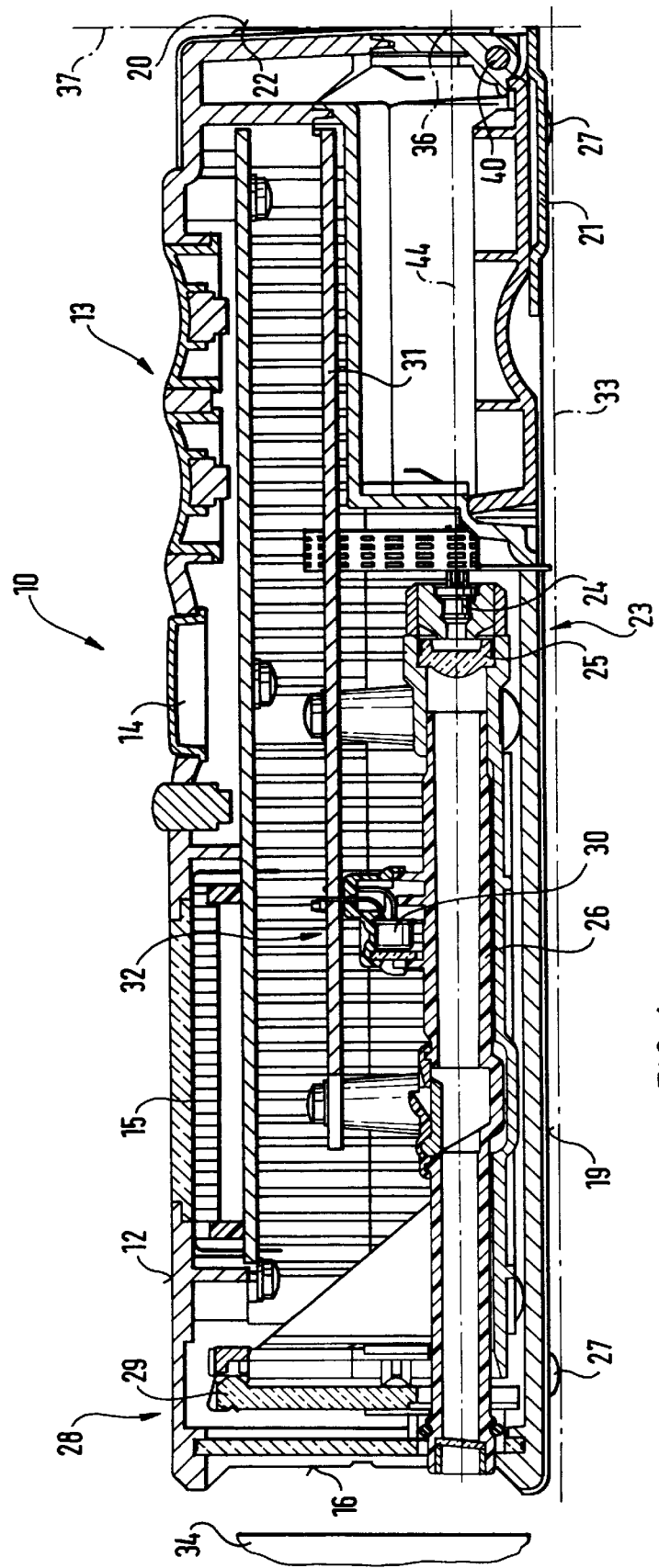
FIG. 4 is a longitudinal section through the inventive distance measuring device of FIG. 1.
Figure 5:
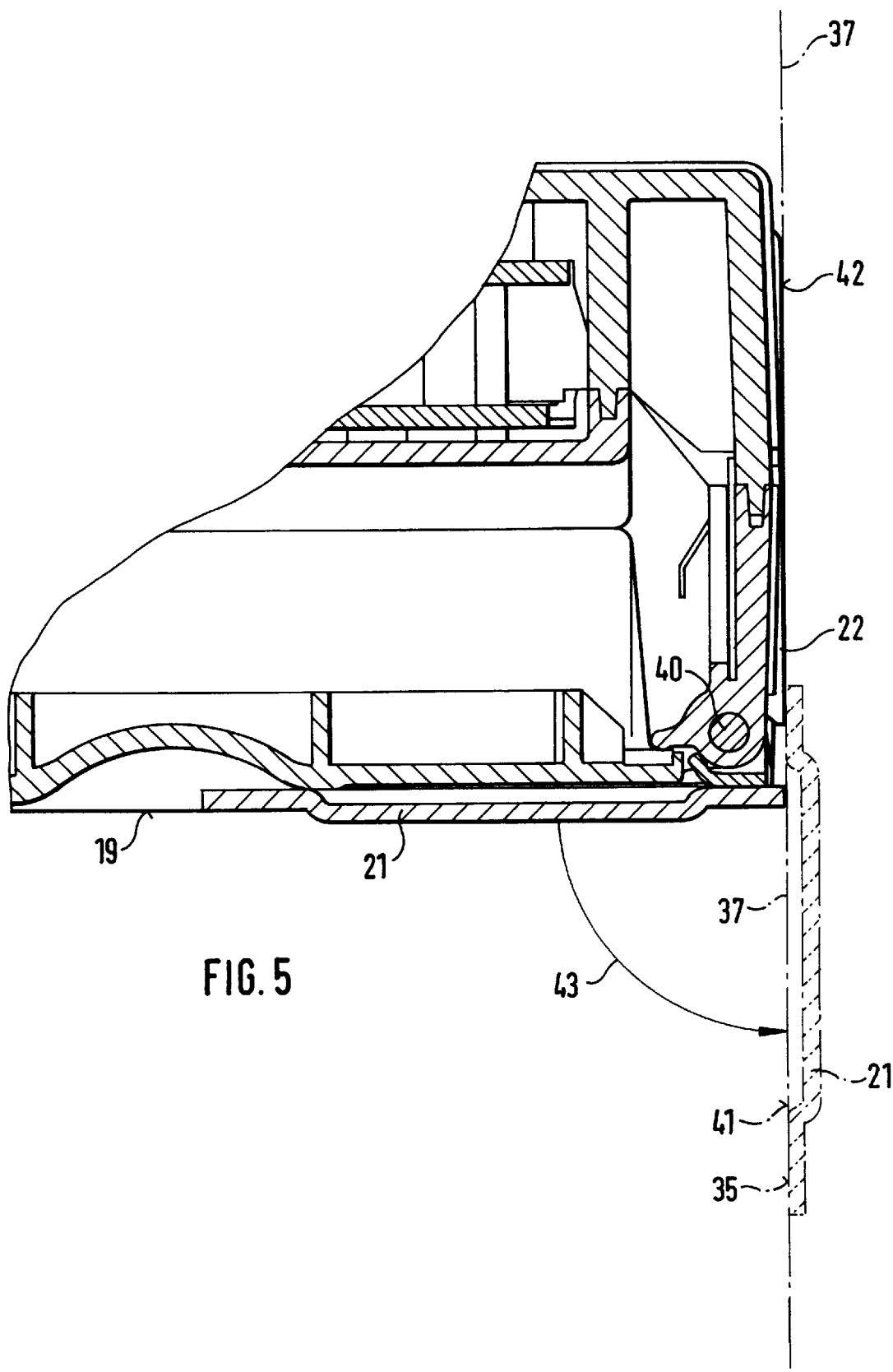
FIG. 5 is a partial view through a rear part of the distance measuring device.

The determination of the object distance is performed with reference to a housing-side reference point 36 which is located substantially in an intersection point of a reference plane 37 formed at the rear side 20 of the housing 1 by the abutment strips 22, with an outlet axis 44 of the measuring signal. The reference plane 37 for distance measurements, is brought in abutment with it, for example starting from a wall. The distance measurement is performed always starting from the reference plate 37 or the reference point 36 arranged in it. The flap 21 is provided at the lower side 19 of the housing 11 and supported turnably in a hinge 40. In the turned-in position shown in FIG. 4 it is located above an abutment surface 33 formed by a projecting cam 27. As can be seen from FIG. 5 the flap 21 can turn from its turned-in position on the lower end 19 in direction of the arrow 43 to a position in which it forms with an inner side 35 an abutment surface 41 which faces the object and is also located in the reference plane 37. In this position the flap 21 abuts against the abutment surface 22 with an end located near the hinge 40.

For measurements starting from the surfaces or edges facing away from the object, an abutment surface 41 is supported on the corresponding reference surface. The distance measuring device 10, if condition permit, abut with its lower side 19 and can displace in an object direction until the inner side 35 abuts against the reference surface. Since the inner side 35 and the reference plane 37 correspond to one another, no recalculation between different reference points is needed.

The front side 21 is clearly curved. Thereby it is prevented that the user can intentionally bring the front side 21 to abutment against a reference surface. A reference mount 45, 46 on the housing 11 is arranged at least at one end side. In the shown example it is arranged on the front side and the rear side 19, 20. The reference marks 45, 46, are located in one plane which stretches through a perpendicular from the outlet axis 44 of the measuring signal to the abutment surface 43. The reference marks 45, 46 make possible a central placing of the distance measuring device 10 on a line which is parallel to the outlet axis 44.

It will be understood that each of the elements described above, or two or more together, may also find a useful application in other types of constructions differing from the types described above.

While the invention has been illustrated and described as embodied in distance measuring device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A distance measuring device, comprising a housing; transmitting and receiving means for a measuring signal arranged in said housing; evaluating means for determining a distance to an object by a travel time measurement; at least one reference point fixed on said housing to which a measured distance is referred, said at least one reference point being a part of a reference plane, such that an abutment surface which faces an object and an abutment surface which faces away in a substantially opposing direction from the object are arranged in said reference plane and fixed to said housing.

2. A distance measuring device as defined in claim 1, wherein said abutment surfaces extend substantially perpendicular to an outlet axis of a measuring signal.

3. A distance measuring device as defined in claim 1, wherein said housing has a front side which faces an entry and an exit of the measuring signal and which is curved.

4. A distance measuring device as defined in claim 1, wherein said housing has at least one end side provided with a reference mark located in a plane which extends through a perpendicular line from an outlet axis of the measuring signal to a housing-side abutment surface.

5. A distance measuring device, comprising a housing; transmitting and receiving means for a measuring signal arranged in said housing; evaluating means for determining a distance to an object by a travel time measurement; at least one reference point fixed on said housing to which a measured distance is referred, said at least one reference point being a part of a reference plane, such that an abutment surface which faces an object and an abutment surface which faces away in a substantially opposing direction from the object are arranged in said reference plane and fixed to said housing, said abutment surface facing the object extending outwardly beyond a housing-side abutment surface.

6. A distance measuring device as defined in claim 5, wherein said housing-said abutment surface is formed by a projecting cam formed on a lower side of said housing.

7. A distance measuring device as defined in claim 5, wherein said abutment surface which faces the object is lowered relative to said housing-side abutment surface.

8. A distance measuring device, comprising a housing; transmitting and receiving means for a measuring signal arranged in said housing; evaluating means for determining a distance to an object by a travel time measurement; at least one reference point fixed on said housing to which a measured distance is referred, said at least one reference point being a part of a reference plane, such that an abutment surface which faces an object and an abutment surface which faces away in a substantially opposing direction from the object are arranged in said reference plane and fixed to said housing, said abutment surface which facing the object is formed as a flap which is turnably supported relative to a housing in a hinge.

9. A distance measuring device as defined in claim 8, wherein said flap has an inner side which in a turned-out position forms said abutment surface which faces the object.

* * * * *